(12) United States Patent
Briand et al.

(10) Patent No.: US 6,831,248 B2
(45) Date of Patent: Dec. 14, 2004

(54) USE OF HELIUM/NITROGEN GAS MIXTURES FOR THE LASER WELDING OF STAINLESS STEEL PIPES

(75) Inventors: Francis Briand, Paris (FR); Karim Chouf, Epinay s/seine (FR); Philippe Lefebvre, Saint Ouen l'Aumône (FR); Eric Verna, Boissy l'Aillerie (FR)

(73) Assignee: L'Air Liquide, S.A., Paris (FR)

( * ) Notice: Subject to any disclaimer, the term of this patent is extended or adjusted under 35 U.S.C. 154(b) by 0 days.

(21) Appl. No.: 10/457,219

(22) Filed: Jun. 9, 2003

(65) Prior Publication Data

US 2003/0230557 A1 Dec. 18, 2003

(30) Foreign Application Priority Data

Jun. 14, 2002 (FR) .............................................. 02 07347

(51) Int. Cl.[7] .......................... B23K 26/24; B23K 26/12
(52) U.S. Cl. ................................................. 219/121.64
(58) Field of Search ....................... 219/121.63, 121.64; 420/63; 148/325, 334

(56) References Cited

U.S. PATENT DOCUMENTS

| | | | | |
|---|---|---|---|---|
| 4,527,040 A | * | 7/1985 | Moon et al. | 219/121.64 |
| 4,656,332 A | * | 4/1987 | Gross et al. | 219/121.64 |
| 4,724,297 A | | 2/1988 | Nielsen | 219/121.67 |
| 4,871,897 A | | 10/1989 | Nielsen | 219/121.67 |
| 4,891,077 A | | 1/1990 | Roll et al. | 219/121.67 |
| 5,489,345 A | * | 2/1996 | Koike et al. | 148/325 |
| 5,766,376 A | * | 6/1998 | Hasegawa et al. | 148/328 |
| 2002/0136661 A1 | * | 9/2002 | Yazawa et al. | 420/63 |

FOREIGN PATENT DOCUMENTS

| | | |
|---|---|---|
| DE | 2 713 904 | 10/1978 |
| DE | 3 619 513 | 12/1987 |
| DE | 3 934 920 | 5/1990 |
| DE | 4 034 745 | 7/1991 |
| DE | 4 123 716 | 1/1993 |
| DE | 19961697 A1 * | 7/2001 |
| JP | 61-232087 A * | 10/1986 |
| JP | 8-132262 A * | 5/1996 |
| JP | 09220683 | 8/1997 |
| WO | WO 88 01553 | 3/1988 |
| WO | WO 97/34730 | 9/1997 |
| WO | WO 98 14302 | 4/1998 |

OTHER PUBLICATIONS

French Search Report 02 07347.
Patent Abstracts of Japan; publication No. 01005692; publication date Jan. 10, 1989; application date Jun. 26, 1987; application No. 62159337.
Patent Abstracts of Japan; publication No. 01048692; publication date Feb. 23, 1989; application date Feb. 23, 1989; application No. 62205140.
Patent Abstracts of Japan; publication No. 02030389; publication date Jan. 31, 1990; application date Jul. 20, 1988; application No. 63178946.
Patent Abstracts of Japan; publication No. 56122690; publication date Sep. 26, 1981; application date Feb. 28, 1980; application No. 55024821.
Patent Abstracts of Japan; publication No. 62104693; publication date May 15, 1987; application date Oct. 31, 1985; application No. 60244750.

* cited by examiner

*Primary Examiner*—Geoffrey S. Evans
(74) *Attorney, Agent, or Firm*—Elwood L. Haynes; Linda K. Russell

(57) ABSTRACT

Process for welding together the two longitudinal edges of a sheet of austenitic, ferritic or martensitic stainless steel so as to obtain a welded pipe, employing at least one laser beam having a power ranging up to 12 kW, and in which a gas mixture is used that consists of 30% to 80% nitrogen by volume and of helium for the remainder (up to 100%). The stainless steel sheet has a thickness of 0.5 to 4 mm and the pipe obtained has a diameter of 5 mm to 50 cm. The welding is full-penetration welding.

16 Claims, 1 Drawing Sheet

FIGURE
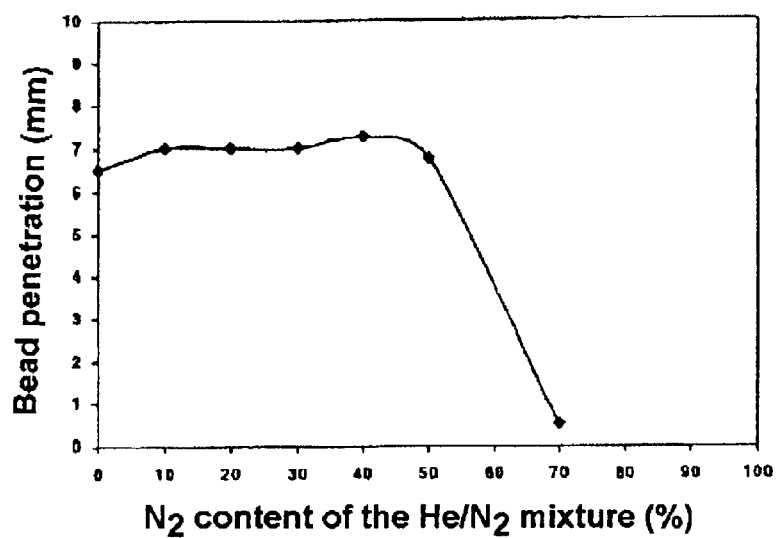

USE OF HELIUM/NITROGEN GAS MIXTURES FOR THE LASER WELDING OF STAINLESS STEEL PIPES

The present invention relates to the use of gas mixtures formed solely from helium arid nitrogen in a laser welding process, operating at a maximum power of 12 kW, for welding austenitic, martensitic or ferritic stainless steel pipes.

It has already been proposed to weld tubes, longitudinally or helically, using a laser beam.

In fact, laser beam welding is a very high-performance joining process as it makes it possible to obtain, at high speeds, very great penetration depths compared with other more conventional processes, such as plasma welding, MIG (Metal Inert Gas) welding or TIG (Tungsten Inert Gas) welding.

This is explained by the high power densities involved when focusing the laser beam by one or more mirrors or lenses in the joint plane of the workpieces to be welded, for example power densities that may exceed $10^6$ W/cm$^2$.

These high power densities cause considerable vaporization at the surface of the workpieces which, expanding to the outside, induces progressive cratering of the weld pool and results in the formation of a narrow and deep vapour capillary called a keyhole in the thickness of the plates, that is to say in the joint plane.

This capillary allows the energy of the laser beam to be directly deposited depthwise in the plate, as opposed to the more conventional welding processes in which the energy deposition is localized on the surface.

In this regard, the following documents may be cited: DE-A-2 713 904, DE-A-4 034 745, JP-A-01048692, JP-A-56122690, WO 97/34730, JP-A-01005692, DE-A-4 123 716, JP-A-02030389, U.S. Pat. No. 4,871,897, JP-A-230389, JP-A-62104693, JP-A-15692, JP-A-15693, JP-A-15694, JP-A-220681, JP-A-220682, JP-A-220683, WO-A-88/01553, WO-A-98/14302, DE-A-3 619 513 and DE-A-3 934 920.

This capillary is formed from a metal vapour/metal vapour plasma mixture, the particular feature of which is that it absorbs the laser beam and therefore traps the energy within the actual capillary.

One of the problems with laser welding is the formation of a shielding gas plasma.

This is because the metal vapour plasma, by seeding the shielding gas with free electrons, may bring about the appearance of a shielding gas plasma which is prejudicial to the welding operation.

The incident laser beam may therefore be greatly disturbed by the shielding gas plasma.

The interaction of the shielding gas plasma with the laser beam may take various forms but it usually results in an effect whereby the incident laser beam is absorbed and/or diffracted and this may lead to a substantial reduction in the effective laser power density at the surface of the target, resulting in a reduction in the penetration depth, or even in a loss of coupling between the beam and the material and therefore a momentary interruption in the welding process.

The power density threshold at which the plasma appears depends on the ionization potential of the shielding gas used and is inversely proportional to the square of the wavelength of the laser beam.

Thus, it is very difficult to weld under pure argon with a $CO_2$-type laser, whereas this operation may be carried out with very much less of a problem with a YAG-type laser.

In general, in $CO_2$ laser welding, helium is used as shielding gas, this being a gas with a high ionization potential and making it possible to prevent the appearance of the shielding gas plasma, and to do so up to a laser power of at least 45 kW.

However, helium has the drawback of being an expensive gas and many laser users prefer to use other gases or gas mixtures that are less expensive than helium but which would nevertheless limit the appearance of the shielding gas plasma and therefore obtain welding results similar to those obtained with helium, but at a lower cost.

Thus, gas mixtures are commercially available that contain argon and helium, for example the gas mixture containing 30% helium by volume and the rest being argon, sold under the name LASAL™ 2045 by L'Air Liquide™, which make it possible to achieve substantially the same results as helium, for $CO_2$ laser power levels below 5 kW and provided that the power densities generated are not too high, that is to say above about 2000 kW/cm$^2$.

However, the problem that arises with this type of Ar/He mixture is that it is no longer suitable for higher laser power densities, since the threshold at which the shielding gas plasma is created is then exceeded, thereby preventing a full-penetration weld to be obtained when welding a stainless steel pipe.

Now, when welding a pipe, it is paramount for there to be total or almost total penetration of the weld in order to avoid any subsequent fracture of the pipe thus welded, during forming operations such as bending or flaring, or during its subsequent use, when the pipe is subjected to various stresses, such as thermal and/or mechanical stresses, or else when it has to be used to convey corrosive substances.

In addition, in some applications, the welded pipe must have a high pitting corrosion resistance, that is to say a pitting index PI relevant to the application.

The index PI is defined by the following formula:

$$PI=[\% \ Cr]+3.3\times[\% \ Mo]+16\times[\% \ N]$$

where [% Cr], [% Mo] and [% N] denote the proportions by weight of chromium, molybdenum and nitrogen in the weld.

As will be understood from this formula, the pitting corrosion resistance increases with the chromium content, with the molybdenum content, the effect of which on the pitting corrosion resistance is 3.3 times greater than in the case of chromium, and with the nitrogen content, the effect of which is 16 times greater than that of chromium.

For an application requiring good pitting corrosion resistance in a particular environment, the grade of steel adopted, and therefore its composition, depends on the environment.

When this steel is welded, whatever the welding process, segregation always occurs during solidification of the molten metal, the first parts to solidify (dendrite cores) generally containing lower amounts of the alloying elements than the last parts to solidify (interdendritic spaces).

Moreover, the welding of austenitic stainless steels often results in the molten metal having an austenite+ferrite hybrid structure. The chemical composition of these two phases differ: austenite is richer in "gammagenic" elements (elements promoting the stability of the γ phase (austenite)) whereas ferrite is richer in "alphagenic" elements (elements promoting the stability of the α phase (ferrite)).

Carbon (C), nitrogen (N) and nickel (Ni) are gammagenic elements, whereas chromium (Cr), molybdenum (Mo) and silicon (Si) are alphagenic elements.

Thus, in a steel weld having a certain Cr, Ni and Mo content, after solidification, there will be zones that are richer than the average composition, enriched with Cr and Mo, and zones enriched with Ni, C and N, and therefore zones of different corrosion resistance, some of these having a corrosion resistance necessarily lower than those of the base metal.

A nitrogen enrichment of the molten metal by the use of a gas mixture containing nitrogen makes it possible to reduce, if not eliminate, these differences in corrosion resistance. Nitrogen, being predominantly in the austenitic phase, partially or completely compensates for the lower Cr and Mo content of this phase associated with the enrichment of the ferrite with these elements.

Thus, document JP-A-09220682 recommends a process for the laser welding of a duplex steel pipe using an $He/N_2$ mixture, the duplex steel being a steel having a generally high pitting index, that is to say always greater than 35.

In view of this, it will be understood that the problem remains in its entirety for steels other than duplex or superduplex steels having a high corrosion resistance, that is to say steels usually having a lower corrosion resistance.

The object of the present invention is therefore to provide a process for the laser welding of stainless steel pipes, more particularly those made of stainless steel of the austenitic, ferritic or martensitic type, with a nitrogen-based welding gas mixture, that can be employed with a laser power of up to 12 kW, which results in the formation of an effective full-penetration welded joint resistant to corrosion, particularly pitting corrosion, and to do so despite the fact that the base steel has only a low corrosion resistance, that is to say a pitting index of less than 35.

The solution of the invention is therefore a process for welding together the two longitudinal edges of a sheet of austenitic, ferritic or martensitic stainless steel, having a thickness of 0.5 to 4 mm, so as to obtain a welded pipe, employing at least one laser beam having a power ranging up to 12 kW, and in which a gas mixture is used that consists of 30% to 80% nitrogen by volume and of helium for the remainder (up to 100%) in order to carry out full-penetration or almost full-penetration welding;

the stainless steel sheet has a thickness of 1 mm to 3 mm;

the pipe obtained has a diameter of 5 mm to 50 cm;

the gas mixture consists of 40% to 70% nitrogen by volume and of helium for the remainder (up to 100%), preferably of 45 to 65% nitrogen by volume, more preferably still of 46 to 60% nitrogen;

the laser is of the $CO_2$ type;

a full-penetration weld is produced;

prior to welding the edges of the metal sheet, the said edges are brought together into the form of an O-shaped unwelded pre-tube by means of press rolls;

the pipe is welded edge to edge with an axial, longitudinal or helical joint;

the steel sheet forming the pipe has a pitting index (PI) such that:

$$PI=[\% \ Cr]+3.3\times[\% \ Mo]+16\times[\% \ N]$$

with PI<35
where [% Cr], [% Mo] and [% N] are the proportions by weight of chromium, molybdenum and nitrogen in the stainless steel of the sheet to be welded;

the focal spot is circular or oblong;

the gas flow rate is between 5 l/min and 100 l/min;

the pressure of the gas is between 1 and 5 bar;

the nozzle delivering the gas is a lateral nozzle having a diameter ranging from 3 to 30 mm or an axial nozzle having a diameter ranging from 1 to 50 mm; and the metal sheet is moved at a non-zero rate of displacement with respect to the welding head delivering the laser beam.

The invention will be more clearly understood from the illustrative examples below and from the appended curves.

EXAMPLES

The effectiveness of the process of the invention was verified by measuring the penetration of the partially penetrated fusion lines produced with a $CO_2$ laser focused by a parabolic mirror having a focal length of 200 mm, onto the surface of a metal target made of 304 L-type stainless steel (austenitic steel) and having a thickness of 12 mm.

The shielding gas consisted of an $He/N_2$ mixture. The nitrogen content of the mixture is plotted as a percentage by volume on the X-axis, the remainder of the mixture being helium.

The gas was delivered to the interaction zone by a lateral nozzle in the form of a cylinder having a diameter of 12 mm and at a flow rate of 24 l/min. The welding speed was 3.5 m/min.

As may be seen in the FIGURE appended hereto, the penetration of the weld beads is at least maintained for high nitrogen contents, that is to say ranging from 30 to 80% by volume.

Even a surprising increase in the penetration of the beads of around 5 to 10% in some cases is observed.

In other words, the helium/argon mixtures according to the invention result in weld bead penetration depths at least equal to those obtained with helium, while improving the nature of the back weld bead: wettability, joining fillet, appearance, etc.

This is because the nature of the back of the weld will be better when the power of the laser passing through the sheet is greater than at least 5% of the incident laser power.

However, it appears that, for equivalent welding parameters, the power of the laser passing through the thickness of the sheet during the welding process via the capillary or keyhole is higher in the case when a shielding gas formed from a helium/nitrogen mixture is used than in the case when a shielding gas composed only of helium is used.

The endothermic dissociation of the nitrogen molecules near the surface metal plasma plume results in a reduction in the temperature of the latter.

The absorption of the incident laser beam by the metal plasma plume is then less effective and the amount of laser energy available beyond the thickness of the sheet is slightly higher.

This type of result is reproducible if one of the above experimental parameters is varied.

The process of the invention is particularly well suited to integration on an automated line for producing welded pipes, on which the forming of the metal sheet (into the form of an O) and its displacement are automated and are accomplished in particular by means of drive rolls and press rolls.

What is claimed is:

1. A process for welding two longitudinal edges of a stainless steel sheet, said stainless steel containing Cr, Mo, and N, comprising:

a) providing a stainless steel sheet having two longitudinal edges; and b) welding said two longitudinal edges together by means of at least one $CO_2$ laser beam and of a gas mixture comprising of nitrogen and helium, said gas mixture comprising from about 30% to about 80% said nitrogen by volume thus obtaining a welded pipe, said pipe having a pitting index (PI) less than 35, wherein the pitting index is: PI=% Cr+3.3% Mo+16% N.

2. The process according to claim 1, wherein the type of said stainless steel sheet is selected from the group consisting of austenitic, ferritic, and martensitic.

3. The process according to claim 1, wherein said sheet has a thickness of about 0.5 mm to about 4 mm.

4. The process according to claim 2, wherein said sheet has a thickness of about 1 mm to about 3 mm.

5. The process according to claim 1, wherein said process will produce a welded pipe.

6. The process according to claim 5, wherein said pipe comprises a diameter of about 5 mm to about 500 mm.

7. The process according to claim 1, wherein said laser has a power up to about 12 kW.

8. The process according to claim 1, wherein said gas mixture consists of about 30% up to about 70% said helium by volume.

9. The process according to claim 1, wherein said gas mixture comprises from about 40% to about 70% said nitrogen by volume.

10. The process according to claim 1, wherein said gas mixture consists of about 30% up to about 60% said helium by volume.

11. The process according to claim 1, wherein said gas mixture comprises from about 45% to about 65% said nitrogen by volume.

12. The process according to claim 1, wherein said gas mixture comprises from about 46% to about 60% said nitrogen by volume.

13. The process according to claim 12, wherein said gas mixture consists of about 40% up to about 54% said helium by volume.

14. The process according to claim 1, wherein the weld obtained at step b) is at full-penetration or at almost full-penetration welding.

15. The process according to claim 14, wherein said process produces a full-penetration weld.

16. The process according to claim 1, wherein said gas mixture consists of a binary mixture of nitrogen and helium.

* * * * *

UNITED STATES PATENT AND TRADEMARK OFFICE
CERTIFICATE OF CORRECTION

PATENT NO. : 6,831,248 B2
DATED : December 14, 2004
INVENTOR(S) : Francis Briand, Karim Chouf, Philippe Lefebvre and Eric Verna It is certified that error appears in the above-identified patent and that said Letters Patent is hereby corrected as shown below:

Column 5,
Line 11, please replace the words "claim 2" with the words -- claim 3 --.

Signed and Sealed this

Eighth Day of March, 2005

JON W. DUDAS
*Director of the United States Patent and Trademark Office*